US012804569B2

(12) United States Patent
Guerrero et al.

(10) Patent No.: US 12,804,569 B2
(45) Date of Patent: Nov. 17, 2026

(54) METHOD AND ASSOCIATED EQUIPMENT FOR SYNCHRONISING A WIRELESS REMOTE DATA TRANSMISSION SYSTEM

(71) Applicant: SAFRAN DATA SYSTEMS, Courtaboeuf Cedex (FR)

(72) Inventors: Ghislain Guerrero, Moissy-Cramayel (FR); Valentin Chomel, Moissy-Cramayel (FR)

(73) Assignee: SAFRAN DATA SYSTEMS, Courtaboeuf Cedex (FR)

( * ) Notice: Subject to any disclaimer, the term of this patent is extended or adjusted under 35 U.S.C. 154(b) by 256 days.

(21) Appl. No.: 18/711,249

(22) PCT Filed: Nov. 17, 2022

(86) PCT No.: PCT/FR2022/052115

§ 371 (c)(1),
(2) Date: May 17, 2024

(87) PCT Pub. No.: WO2023/089278

PCT Pub. Date: May 25, 2023

(65) Prior Publication Data

US 2025/0008451 A1 Jan. 2, 2025

(30) Foreign Application Priority Data

Nov. 19, 2021 (FR) ....................................... 2112282

(51) Int. Cl.
*H04W 56/00* (2009.01)
*H04J 3/06* (2006.01)

(52) U.S. Cl.
CPC ......... *H04W 56/001* (2013.01); *H04J 3/0661* (2013.01)

(58) Field of Classification Search
CPC ............................ H04W 56/001; H04J 3/0661
See application file for complete search history.

(56) References Cited

U.S. PATENT DOCUMENTS

2008/0117938 A1 5/2008 Erich et al.
2011/0170534 A1 7/2011 York
(Continued)

OTHER PUBLICATIONS

Cho et al., "Precision Time Synchronization using IEEE 1588 for Wireless Sensor Networks," 2009 International Conference on Computational Science and Engineering, Piscataway, NJ, USA, 2009, pp. 579-586.
(Continued)

*Primary Examiner* — Kent Krueger

(74) *Attorney, Agent, or Firm* — BIRCH, STEWART, KOLASCH & BIRCH, LLP

(57) ABSTRACT

The invention relates to a piece of equipment (1) of a system for transmitting data remotely in accordance with a wireless communication standard, comprising a processing unit (50) coupled to a radio front-end unit (20) which provides bi-directional radio frequency communication with a piece of remote equipment, the radio front-end unit comprising an analogue block (30) and a digital block (40) which exchange digital waveform samples. The processing unit (50) includes a synchronisation module (52) configured to initiate the exchange with the remote equipment of synchronisation messages selected from messages of the wireless communication standard. The digital block (40) comprises 10 an identification module (43) configured to detect and date the synchronisation messages exchanged with the remote equipment.

16 Claims, 2 Drawing Sheets

(56) References Cited

U.S. PATENT DOCUMENTS

| | | | | |
|---|---|---|---|---|
| 2016/0142756 | A1* | 5/2016 | Scott | H04N 21/8547 725/116 |
| 2017/0346588 | A1* | 11/2017 | Prins | H04J 3/0667 |
| 2021/0099966 | A1* | 4/2021 | Acher | H04J 3/065 |
| 2021/0159938 | A1* | 5/2021 | Subraveti | H04B 1/7073 |
| 2021/0206347 | A1* | 7/2021 | Golsch | B60R 25/24 |
| 2022/0124156 | A1* | 4/2022 | Werly | H04Q 9/00 |

OTHER PUBLICATIONS

French Search Report for French Application No. 2112282, dated Jul. 28, 2022.

International Search Report for International Application No. PCT/FR2022/052115, dated Mar. 14, 2023.

Percie Du Sert, "Hybridization of wireless technologies for the aerospace instrumentation," International Telemetering Conference Proceedings, vol. 55, 2019, pp. 1-10.

* cited by examiner

METHOD AND ASSOCIATED EQUIPMENT FOR SYNCHRONISING A WIRELESS REMOTE DATA TRANSMISSION SYSTEM

TECHNICAL FIELD

The field of the invention is that of wireless remote data transmission between slave equipments and a master equipment. The invention more specifically relates to the synchronization of the different slave equipments with a reference time base of the master equipment. The invention in particular has an application in the instrumentation of industrial tests, for example in the field of transportation, by sea or air (flight tests).

PRIOR ART

The instrumentation of industrial tests used to be done mainly by connecting sensors to data conditioning and acquisition systems using conductive cables. At present it is desirable to dispense with these cables, which are time-consuming and difficult to install, require the modification of structures (drilling) and are intrusive, heavy and eventually expensive.

The use of wireless instrumentation networks is increasingly prevalent in instrumentation. To produce small and inexpensive systems, it is possible to employ wireless communication standards which are widespread on the mass market, provided for local networks or IoT (Internet Of Things) such as Wi-Fi™, Bluetooth™, ZigBee™ or IR-UWB (Impulse Radio Ultra Wide Band). These standards specify waveforms over the air interface (transmitted or received radio frequency signal) and formatting protocols for carrying the useful data in them. It is also possible to use a cellular telephone (3G, 4G or 5G) or long-distance proprietary network technology (LoRaWan® or SigFox for example).

The use of such a wireless instrumentation network requires the synchronization of all the different terminations (slave equipments) which carry out the acquisition of data measured by the sensors. Specifically, each acquisition must be dated (time-stamped) so as to be able to reconstruct an overall history of the acquisitions and reveal the correlative links between the different physical phenomena observed by a plurality of sensors. Most of the standards mentioned previously synchronize the terminations by distributing a message containing the date of a master equipment (base station or access point). The slave equipments then set their clocks to the received date. Given the variation of the time of flight (propagation time) of the message and the uncertainties on the processing time, this technique does not make it possible to synchronize the slave terminations with an accuracy better than several tens of microseconds, or even more in the case of Wi-Fi™ for example.

This synchronization accuracy proves inadequate for certain instrumentation systems which may require synchronizations at less than 100 nanoseconds. Such is the case, for example, of systems performing modal analysis on the large-scale deformations of a ship or an aircraft, up to 20 or 30 kHz.

One of the aforementioned communication standards allows for finer synchronization. This is Impulse Radio Ultra Wide Band (IR-UWB), which uses impulses of very short duration and a wide frequency spectrum and is thus capable of providing very accurate location in enclosed spaces by accurately measuring the time of flights of the communication with the terminations. However, IR-UWB in its current commercial implementation suffers from power limitations and is therefore not used for high-speed data transmission, its performance being typically far below 10 Mbps.

To overcome this limitation, a solution described in the article "Hybridization of wireless technologies for the aerospace instrumentation", International Telemetering Conference Proceedings, Volume 55 (2019) consists in a hybridization of IR-UWB with another high-speed wireless communication standard, in particular Wi-Fi.

But this solution suffers from other limitations. Firstly, it is highly dependent on suppliers of mass-market components which are different for the two technologies, requiring a new design nearly every year, whereas the lifecycle of users in the particular application of industrial instrumentation is typically of fifteen to twenty years. Next, hybridization requires the coupling of several signals and operating bands, which imposes limitations on the equipments (duplication of the electronics lines, increased power consumption) and the antennas (multiplexing of spectral bands). Finally, this solution does not makes it possible to exploit all the interconnection topologies of equipment using diverse bandwidths, or requiring the system to be partitioned into several subnetworks, since it is also limited by the functions offered by Wi-Fi.

The diversity of requirements (number of nodes, speed, range, power consumption, dissipation, topology etc.) and the associated regulatory restrictions (in particular the frequency bands and transmission powers) require the provision of a generic solution compatible with all wireless communication protocols.

SUMMARY OF THE INVENTION

The aim of the invention is to meet this need by making provision for a generic solution which provides fine synchronization ability with any wireless communication protocol, even if it is not designed for it.

For this purpose, provision is made for an equipment of a remote data transmission system in accordance with a wireless communication standard, comprising a processing unit coupled with a radio front end providing radio frequency two-way communication with a remote equipment. The radio front end comprises an analog block and a digital block which exchange digital samples of waveforms. The processing unit includes a synchronization module configured to trigger the exchange with the remote equipment of synchronization pulses chosen from among the messages of the wireless communication standard. The digital block comprises an identification module configured to detect and date the synchronization pulses exchanged with the remote equipment.

The invention thus supplies a solution that is independent of the wireless communication protocols and which is able to guarantee high-performance synchronicity (typically with a time difference in sub-microseconds, for example less than 100 ns) at any remote point of a wireless network, for example for instrumentation. In such a way, as required, whether to obtain very high-speed transmissions, interconnect remote equipments with a minimum of topological restrictions or be very resistant to interference or to multi-trajectory propagation environments, the selection of the protocol used can be made solely based on this communication criterion without worrying about the synchronization performance.

Certain preferred but non-limiting aspects of this equipment are as follows:

to detect the synchronization pulses, the identification module is configured to perform a correlation of the messages exchanged with the remote equipment with a known profile of the wireless communication standard messages chosen as synchronization pulses;

the digital block comprises a timer operating in a local time base and the identification module makes use of the timer to associate a chronological date with each of the detected synchronization pulses;

it comprises a clock signal generator and the timer is incremented by the clock signal, by a multiple or submultiple of the clock signal or by a signal synchronized with the clock signal;

the identification module is configured to make available to the synchronization module the chronological dates of the detected synchronization pulses;

the synchronization module is configured to translate the chronological dates into calendar dates;

it operates as a slave equipment of the remote equipment and the synchronization module is configured to determine a time-based resetting setpoint;

the synchronization module is configured to determine the time-based resetting setpoint by measuring the outward time of flight added to the return time of flight of synchronization pulses exchanged with the remote equipment;

the synchronization module is moreover configured to estimate a drift from a calendar time base by drifting successive time-based resetting setpoints;

the synchronization module is moreover configured to determine a resetting setpoint of the clock signal;

the processing unit comprises a module for acquisition and formatting of the data from a sensor;

it operates as a master equipment of the remote equipment and the synchronization module is moreover configured to determine calendar dates based on local chronological dates corresponding to the transmission and reception dates of synchronization pulses detected and dated by the identification module and, moreover, to generate and transmit to the transceiver useful data comprising the values of said calendar dates to be transmitted in signaling messages.

BRIEF DESCRIPTION OF THE DRAWINGS

Other aspects, aims, advantages and features of the invention will become more apparent on reading the following detailed description of preferred embodiments thereof, given by way of non-limiting example, and given with reference to the appended drawings in which.

DETAILED SUMMARY OF PARTICULAR EMBODIMENTS

The invention relates to a system for remote transmission of data comprising a master equipment and a plurality of slave equipments, each slave equipment being in wireless two-way communication with the master equipment. The wireless two-way communication is effected in accordance with a wireless communication standard, for example WiFi, LTE, Bluetooth or UWB.

All the equipments (master and slaves) each have a local time base. These equipments are functionally identical, the only difference being that the time base of the master equipment, which can be synchronized or not synchronized with a universal time base (satellite positioning system, coordinated universal time etc.) or an ultra-stable time base (atomic clock), by definition constitutes the reference time base of the remote transmission system with which the slave equipments are synchronized.

Figure 1:
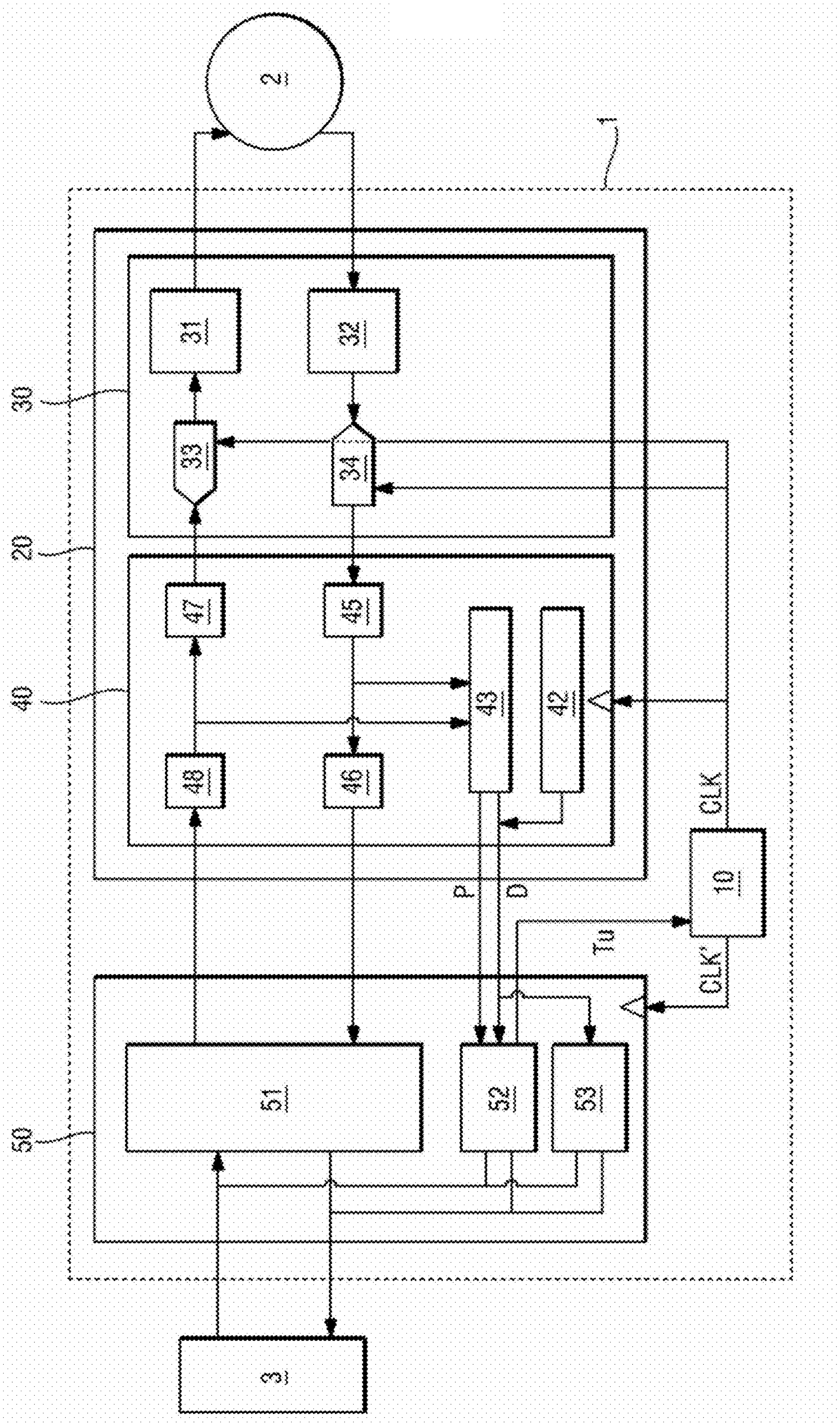
FIG. 1 is a diagram of an equipment in accordance with a possible embodiment of the invention.

With reference to FIG. 1, the invention thus makes provision for an equipment 1 which can serve as master or slave according to whether or not its local time base is slaved in accordance with the mechanism described below. This equipment 1 is in radio frequency two-way communication over the air interface with a remote equipment, this remote equipment being the master equipment if the equipment 1 is a slave equipment or on the contrary a slave equipment if the equipment 1 is the master equipment.

The equipment 1 comprises a local clock signal generator 10 which clocks the digital processing, a radio front end 20 coupled, on the one hand, with an antenna 2 to ensure the radio frequency two-way communication over the air interface with the remote equipment and, on the other hand, to a processing unit 50 configured to process the digital samples of the waveforms exchanged as per the wireless communication standard implemented. At the other end, the remote transmitted useful data are exchanged by the processing unit 50 with one or more applications 3 which may be external to the equipment.

The local clock generator 10 contains an oscillator which supplies a periodic signal with a good level of stability alternating between the upper and lower logic levels, known as the clock signal CLK. The clock signal CLK clocks all the operations of the radio front end unit 20 since it controls the conversions. The clock signal CLK or a derivative synchronized clock signal CLK', a multiple or submultiple of CLK, then also clocks the calculations of the processing unit 50. The local clock generator 10 may have a tune control which makes it possible to tune its rate to a small relative frequency range, for example of voltages for a voltage-controlled quartz oscillator VCXO (Voltage Controlled Xtal Oscillator).

The radio front end 20 has the function, in transmission mode, of converting the samples representing the waveform to be transmitted into a radio frequency signal transmitted by the antenna 2 and, in reception mode, to transform the received radio frequency signal into samples representing the waveform to be processed. It comprises an analog block 30 and a digital block 40 which exchange digital samples of waveforms. For the reception of a signal, the analog block 30 comprises an input radio frequency circuit 33 in charge of filtering and amplifying the radio frequency signal incident on the antenna 2 as well as converting it into an intermediate frequency signal. The analog block 30 moreover comprises an ADC (Analog to Digital Converter) 34 which samples the intermediate frequency signal to supply a digital signal to the digital block 40. Within the digital block 40, the digital signal then passes through a DDC (Digital Down Converter) 45 and through a decimation filter 46 which then convert the signal, either into a baseband or onto a digital carrier.

This sampled signal is supplied to the processing unit 50 (i.e. a digital signal processor) which comprises a transceiver 51 here in charge, inter alia, of demodulating and decoding the signal supplied by the digital block 40.

The above is a description of the reception of a signal by the equipment 1. The transmission of a signal by the equipment 1 is achieved by a reverse method. In this case the transceiver 51, inter alia, then encodes and modulates the signal in the baseband or onto a digital carrier, this sampled signal then being passed to the digital block 40. In the digital block, this signal goes through an interpolation filter 48 and through a DUC (Digital Up Converter) 47 which then convert it into an intermediate frequency signal. The intermediate frequency signal is supplied to a DAC (Digital to Analog Converter) 33 of the analog block 30 then to an output radio frequency circuit 31 which then converts it into a radio frequency signal transmitted by the antenna 2.

The analog block 30 makes use of the clock signal CLK to time the conversion operations carried out by the analog-to-digital converter 34 and the digital-to-analog converter 33.

The digital block 40 is a unit which processes the signal sampled at the fast clock speed CLK of the samples of the converters 33 and 34. It can typically be embedded in an FPGA (Field Programmable Gate Array) or in an integrated circuit dedicated to conversion functions. Its interface with the processing unit 50 exchanges samples at a lower rate, typically a submultiple of the clock signal CLK/n with n an integer. Also, the decimation filter 46 has the role of filtering the bandwidth by avoiding spectral aliasing and supplying only one sample over n at the output. Conversely, the interpolation filter 48 has the role of increasing the rate of samples by supplying n samples per input sample while filtering the spectral images created by this oversampling.

Certain radio front ends 20 do not contain all the elements listed above. So-called direct sampling units thus sample the radio frequency without going via an intermediate frequency. There are then no more converters 33 and 34. When the processing unit 50 handles the samples directly at the rate of CLK of the analog block 30 (n=1), the filters 46 and 48 become simple formatting filters of FIR (Finite Impulse Response) type which can, where applicable, be incorporated into the processing unit 50.

The processing unit 50 can be implemented in a SoC (System On Chip) chip, in a programmable ASIC (Application Specific Integrated Circuit), in an FPGA (Field Programmable Gate Array) or on a unit with a processor such as a CPU (Central Processing Unit). Typically, the processing unit 50 disposes of a computing unit with a processor on which it is possible to execute the instructions of a code and to program algorithms. The processing unit 50 comprises at least one transceiver 51 and one synchronization module 52.

The reception function of the transceiver 51 receives the samples of the received waveform from the radio front end unit 20 and supplies the received useful data. The transmission function of the transceiver 51 receives the useful data to be transmitted and supplies the samples of the waveform to be transmitted by the radio front end unit. To do this, the transceiver 51 in particular executes the (de) coding and (de) modulation algorithms, along with those of synchronization of the symbol rate and of the carrier frequency, first allowing, in reception mode, the interpretation of the received waveform into a message of transmitted useful data and then, in transmission mode, the conversion of a message of useful data to be transmitted into an transmitted waveform, all this strictly according to the wireless communication standard implemented. The standard may not include any time base synchronization mechanism. This is in particular the case if no provision is made for any signaling message for sending any date information to the counterpart. Advantageously, the transceiver 51 can be a software operating on a fully programmable processing architecture on FPGA, CPU or SoC and the term "software radio" is then used. This can be a free software program and it is then not necessary to develop it. In general, an on-the-shelf transceiver, whether it is pure radio software or incorporates hardware elements, does not contain any mechanism for precise timestamping of the transmission or reception times of messages or frames of the standard over the air interface.

The processing unit 50 can moreover host other functions, such as an integrated application module processing the useful data transmitted or received 53. This architecture is preferable to that of an external application 3 since it is more economic and compact. This can be a module for acquisition and formatting of data from a sensor, for example in an industrial test instrumentation application or an IoT (Internet of Things) application. The acquisition of these data may comprise an analog conversion clocked by the local clock signal CLK or a submultiple thereof. Several useful data processing applications can be hosted by the processing unit 50, and others can be external to the processing unit 50.

According to the invention, the digital block 40 comprises a timer 42 operating in a local time base which clocks the exchanges of digital samples with the analog block 30.

The local time base can be derived from a local clock, for example the clock signal CLK timing the conversion of the converters 33, 34. In particular, the timer 42 can be a binary counter of a certain depth M which is incremented by the clock signal CLK at the rising or falling edge thereof, or else by a multiple or sub-multiple of the clock signal CLK or by a signal synchronized with it. This counter may have a depth M which is a power of two ($M=2^p$) or be reset to zero after a number M of clock periods design in such a way that its cycle has a duration congruent with the millisecond or second.

In a preferred embodiment, the timer 42 operates at the rate of the digital samples exchanged between the digital block 40 and the analog block 30 of the radio front end 20, i.e. CLK. In another embodiment, the timer operates at the rate of the submultiple signal of the local clock CLK/n which clocks the samples exchanged between the radio front end unit 20 and the processing unit 50.

In the first case, a dating consists in associating an order number with the samples exchanged between the analog block 30 and the digital block 40. In the second case, the dating then associates an order number with one sample out of n exchanged between the analog block 30 and the digital block 40. The dating therefore operates on the lowest layers of the communication system, thus guaranteeing a deterministic and fixed time of transit to the radio medium and a date free of the variability effects due to higher-level protocol layers. The associated date is an order number at the rate of the timer 42 with a cyclical sequence of depth $2^p$. This cyclical data will thus be called chronological date.

The digital block 40 moreover comprises a module 43 for identifying specific messages exchanged with the remote equipment, in particular messages defined by the wireless communication standard which, in the context of the invention, serve to form synchronization pulses of the receiver. The term "synchronization pulse of the receiver" should be understood to mean a message transmitted repeatedly by the communication standard for the purposes of retrieving by the receiver of the symbol rate and the carrier frequency of the transmitter, in the master-slave direction or in the slave-master direction, this message containing an easily identifiable known profile. Using its identification module 43, the digital block 40 can detect and date the synchronization pulses (on transmission and/or on reception) and make available to a synchronization module 52 of the processing unit 50 an item of information P concerning the detection of a synchronization pulse of the receiver and an item of chronological date information D, here corresponding to the time of reception and/or transmission of the detected synchronization pulse.

To detect the synchronization pulses, the identification module 43 can be configured to perform a correlation of the messages exchanged with the remote equipment, on transmission and/or on reception, with a known profile of the messages forming the synchronization pulses.

The known profiles which are unique words, preambles, training sequences or dedicated frames, can be programmed to be resident in the identification module 43 or be loaded at set-up by the processing unit 50. For example, if the Wi-Fi standard is used, then the identification module 43 can advantageously be configured to identify the PLCP (Physical Layer Convergence Procedure) preamble which is placed at the start of each frame transmitted over the air interface. In a preferred embodiment, the identification module 43 computes the correlation of the known profile with the transmitted or received message at the rate of the samples CLK between the filters 46 and 48 and the converters 45 and 47. In another embodiment, the correlation is done on the samples exchanged with the processing unit 50 and in particular with the transceiver 51, so at the rate of CLK/n. The preferred embodiment has a time-domain resolution that is n times finer but requires n times more operations. The identification module 43 selects the relevant correlation peaks according to an algorithm which can have many variants. In general, it seeks the highest peak over a certain sliding window in which there cannot be two known profiles and keeps only those above a previously defined ratio of correlation with the signal energy. For a selected peak, it then supplies to the processing unit 50 and in particular to the synchronization module 52 the chronological date on which the correlation ended. Certain correlators are capable of interpolating the correlation curve between the samples and can therefore supply a slightly more accurate fractional date of the peak.

The synchronization module 52, meanwhile, can be configured to translate the chronological dates into calendar dates defined in days, hours, minutes, seconds and fractions of seconds. To do so, the synchronization module 52 has a "reset" date, i.e. the calendar date that was effective at the time of the last 0 crossing of the timer 42, written $T_0$, which takes place every M cycles of the clock CLK it uses. In this case, the calendar date at the time q of the timer 42 has a value of $T_0+qT$ with T the period of the clock signal CLK. Taking q=M, the update of the next reset date can be determined in advance. There are several calendar date reset techniques. In a preferred embodiment, the synchronization module is configured so that the reset date $T_0$ can take any value with a resolution of T. In an alternative embodiment, the resolution of the reset date is only of MT, the cycle of the timer, which can be in agreement to the millisecond or second to simplify the computation of its calendar dates. In this case, the calendar reset date is accompanied by a chronological reset date which can have a value of 1 to M and sets the timer 42 to zero before it gets to M. The resetting thus here entails a simultaneous reset of the calendar date and of the timer.

When the equipment 1 operates as slave equipment, the reset date takes into account a time-domain resetting setpoint CRT of the calendar time base and/or of the chronological time base with respect to the reference time base of the master equipment. This time-domain resetting setpoint CRT can be determined by the synchronization module 52 by means of the joint exploitation of local chronological dates and calendar dates extracted from the useful data of signaling messages being received by the transceiver 51. The local chronological dates correspond to the correlation peaks of the noteworthy profiles on transmission or on reception of the synchronization pulses and are provided by the identification module 43.

The determination of the time-domain resetting setpoint CRT can be done using a mechanism, based on a two-way exchange and a measurement of the time of flight, akin to the PTP (Precision Time Protocol, IEEE1588). The synchronization module 52 of the equipment, master or slave, regularly repeatedly triggers the sending by the transceiver 51 of synchronization pulses and signaling messages by providing it with useful data to transmit. These messages are chosen from the range offered by the protocol of the standard implemented by the transceiver 51 and may have been designed, inter alia, for carrying out a function of synchronization of the opposite receiver. There is therefore no need to adapt the algorithm of the transceiver incorporated into the processing unit 50 to implement the invention.

Figure 2:
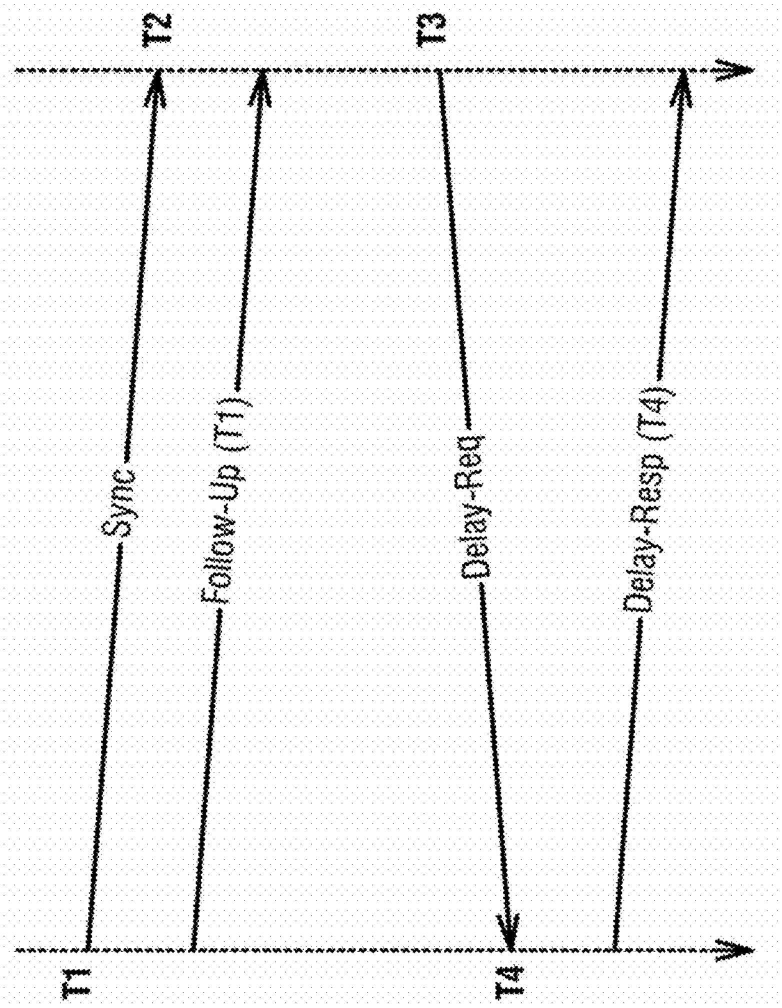
FIG. 2 is a diagram illustrating an example of exchange of synchronization messages between a master equipment (left dotted arrow) and a slave equipment (right dotted arrow).

As shown in FIG. 2, the synchronization comprises the sending, by the master equipment, of a first synchronization pulse "Sync" containing a known profile of the communication standard used, such as a unique word, a preamble or a synchronization frame in the outward direction. On transmission, the identification module 43 of the master equipment determines the time of the correlation peak which dates the end of the passing of the unique word or of the synchronization frame through the digital block of the radio front end. The synchronization module of the master equipment converts this chronological date into a transmission calendar date denoted T1, which is by definition in the reference time base. When receiving by the digital block of the slave equipment, the latter identifies the synchronization pulse "Sync" and dates the end of the passing of the unique word through the digital block of the radio front end by means of its identification module 43. Its chronological date of reception is converted by the synchronization module of the slave equipment into a local calendar date of reception denoted T2.

The master equipment then emits a signaling message, in this case a "Follow-Up (T1)" message containing the exact calendar date of transmission T1 of the first synchronization pulse. The transceiver 51 of the slave equipment extracts the useful data from the "Follow-Up" message and the T1 value is retrieved by the synchronization module of the slave equipment.

In the other direction, the slave equipment then transmits a second synchronization pulse "Delay-Req" containing a known profile of the communication standard such as a unique word, a preamble or a synchronization frame in the return direction. When this pulse is transmitted, the identification module 43 of the slave equipment determines the time of the correlation peak that dates the end of the passing of the unique word or of the synchronization frame through the digital block of the radio front end. The synchronization module of the slave equipment converts this chronological date into a local calendar date of transmission denoted T3. On receiving the second "Delay-Req" synchro pulse by the master equipment, the latter identifies the correlation peak and dates the end of the passing of the unique word through the digital block of the radio front end of the master equipment, by means of its identification module 43. Its chronological date of reception is converted by the synchronization module into a calendar date of reception denoted T4 in the reference time base.

The master equipment then transmits a second signaling message, in this case a delay response message "Delay-Resp (T4)" containing the exact calendar date of reception T4 of the second synchronization pulse "Delay-Req". The transceiver 51 of the slave equipment extracts the useful data from the delay response message "Delay-Resp" and the value of T4 is retrieved by its synchronization module 52.

The synchronization module 52 of the slave equipment now possesses all the elements for proceeding with the resetting of the local time base to the reference time base of the master equipment. As explained below, to determine the resetting setpoint of the calendar time base of the slave equipment, the synchronization module 52 then measures the outward time of flight added to the return time of flight (i.e. T4−T3+T2−T1) of the synchronization pulses exchanged with the remote equipment.

T1 and T4 are expressed in the reference calendar time base whereas T2 and T3 are expressed in the local calendar time base of the slave equipment. Therefore T4−T1 and T3−T2 define time intervals of values independent from the time base, which is assumed to be very stable and accurate. It can be seen in FIG. 2 that the difference between these two intervals corresponds to the outward time of flight of the "Sync" pulse and to the return time of flight of the "Delay-Req" pulse. In practice, the time of flight varies slowly with the propagation channel and is therefore identical in both directions. It can therefore be deduced that the latter has a value of TV=(T4−T3+T2−T1)/2 and that the resetting setpoint to be placed on the local calendar time base of the slave equipment has a value of CRT=T1−T2+TV=T4−T3−TV=(T4−T3−T2+T1)/2, i.e. it is necessary to add CRT to the local calendar time base of the slave equipment to synchronize it with the time base of the master equipment. When the local time base of the slave equipment is synchronized, it can indeed be seen that (T1+T4)/2=(T2+T3)/2 so CRT=0.

There are several ways of applying the CRT resetting. The simplest consists simply in adding the CRT setpoint to the reset date T0 when the latter has a resolution of T. When the resolution is only MT, the cycle of the timer 42, the latter must also be reset to 0 based on the CRT value, modulo MT. If the period of the local clock signal T is considered as a fixed nominal value, then the relative frequency separation of the local clock will cause a drift from the local time base. This is not necessarily obstructive when the recalibrations are made frequently enough to be well below the period T. If such is not the case or if one wishes to improve the accuracy, then this drift must be taken into account. To do so, the synchronization module can moreover be configured to estimate a drift from the calendar time base by then drifting successive resetting setpoints of the calendar time base. In doing so, it is then possible to simultaneously correct $T_0$ and the value of the period T with the estimate of the drift. The value of the resetting CRT divided by the time interval elapsed since the application of the previous resetting CRT constitutes an estimator of it. In other words, if one writes CRT(k) the $k^{th}$ resetting applied to the date $T_k$, T must be corrected by $T[1+CRT(k)/(T_k-T_{k-1})]$. It should be noted that a single clock resetting without any date resetting is also possible, T then having to be corrected by $T[1+(CRT(k)-CRT(k-1))/(T_k-T_{k-1})]$.

In a possible embodiment, the synchronization module is moreover configured to determine a resetting setpoint Tu of the clock signal CLK. Certain applications of useful data 53 specifically require clock synchronicity, such that the date resetting must therefore be accompanied by the resetting of the local clock CLK to make it synchronous with the reference clock. In this case, T is left at its nominal value and the drift estimate is filtered to correct the clock generator by means of its "tune" control. The synchronization module 52 generates this command Tu for the local clock generator 10, incrementing it by a value proportional to the estimator $CRT(k)/(T_k-T_{k-1})$, or to $[CRT(k)-CRT(k-1)]/(T_k-T_{k-1})$ when one wishes to recalibrate the clock alone without recalibrating the date, the whole constituting a PLL (Phase-Locked Loop).

There are many variants on the implementation of the algorithms of the synchronization module. In particular, the sequence of the synchronization pulses and signaling messages described above corresponds to the implementation of the PTP on Ethernet. A reversed message order is possible starting with the slave, as well as a a grouping of the signalization sending of the values of T1 and T4, or the sending of T2 and T3 by the slave followed by a resetting computation by the master, which would send back the setpoint CRT to the slave. The dating in two steps by the cyclical timer, then the setting-up of the calendar equivalence, can also be modified. It is for example possible for the timer to compute the seconds (MT has a value of an integer number of seconds), or even minutes and hours. Since the exchanges of the synchronization pulses and signaling messages take place in a very small fraction of a second, the signaling messages could convey chronological dates T1 and T4, with no calendar translation. Fine synchronization would therefore be done modulo MT (a few seconds or minutes) and the resetting of the time and date of the slave, in the usual sense, would be left to an existing network protocol such as NTP (Network time Protocol, over IP). It is also possible to conceive of a digital block directly generating calendar dates, but the implementation of a fast binary counter in hardware and a calendar in software remains simpler. The algorithms for estimating the drift in clock frequency can also be more complex and include filtering functions to determine the corrected value of the period T or the "tune" control.

It will be understood from the above that when the equipment 1 operates as the master equipment of the remote equipment, its synchronization module is configured, firstly, to determine calendar dates based on local chronological dates corresponding to the dates of transmission and reception T1, T4 of the synchronization pulses "Sync", "Delay-Req" detected and dated by the identification module of the master equipment and, secondly, to generate and transmit to the transceiver useful data comprising the values of the calendar dates T1 and T4 to be transmitted in signaling messages "Follow-Up (T1)", "Delay-Resp (T4)".

According to a second aspect, the invention pertains to a remote data transmission system comprising a master equipment as previously described and a plurality of slave equipments as previously described.

According to a third aspect, the invention pertains to a method implemented within an equipment as previously described, comprising the steps of identification and dating in a local time base, by means of the identification module of the digital block, of the synchronization pulses exchanged with the remote equipment.

When the equipment operates as the slave equipment, these steps can be completed by a step of determination, by the synchronization module of the processing unit, of a setpoint of resetting of the local time base with respect to a reference time base of the master equipment by making joint use of the dating of the synchronization pulses, carried out by the identification module of the digital block, and of the useful data extracted from signaling messages by the transceiver.

According to a fourth aspect, the invention pertains to a computer program product comprising instructions which, when the program is executed by a digital block of an equipment as previously described, lead the latter to implement the steps of identification and dating of the method according to the third aspect of the invention.

According to a fifth aspect, the invention pertains to a computer program product comprising instructions which, when the program is executed by a data processing unit of an equipment as previously described, lead the latter to implement the step of the method according to the fourth aspect of the invention of determination of the resetting setpoint of the local time base with respect to the reference time base of the master equipment.

The invention offers an ultra-high-performance synchronicity by implementing a synchronization mechanism in parallel and independently of the handling of the protocol contained in the implemented wireless communication standard. This synchronization mechanism is therefore operational for any wireless communication protocol that might be selected, even if it is not designed for fine synchronization. Its performance depends only on the synchronization pulses chosen from the range of messages of the standard, according to the features of the unique words, preambles, training sequences or synchronization frames. It can be as fine as a few tens of nanoseconds according to the recurrence of the communications of the synchronization pulses and the local time bases' own drift. The invention therefore makes it possible to communicate data with any wireless communication protocol while providing an effective synchronization in parallel.

The invention claimed is:

1. An equipment of a remote data transmission system, comprising:

a radio front-end providing radio frequency two-way communication with a remote equipment in accordance with a wireless communication standard, the radio front-end comprising an analog block and a digital block which exchange digital samples of waveforms; and a processing unit coupled with the radio front-end, the processing unit including a synchronization module configured to trigger the exchange with the remote equipment of synchronization pulses;

wherein the synchronization pulses are messages of the wireless communication standard having a known profile;

wherein the digital block of the radio front-end comprises an identification module configured to detect and date the synchronization pulses exchanged with the remote equipment; and wherein, to detect the synchronization pulses, the identification module is configured to perform a correlation of the messages exchanged with the remote equipment with the known profile of the synchronization pulses.

2. The equipment as claimed in claim 1, wherein the digital block of the radio front-end comprises a timer operating in a local time base and the identification module is configured to make use of the timer to associate a chronological date with each of the detected synchronization pulses.

3. The equipment as claimed in claim 2, further comprising a generator of a clock signal and wherein the timer is incremented by the clock signal, by a multiple or submultiple of the clock signal or by a signal synchronized with the clock signal.

4. The equipment as claimed in claim 2, wherein the identification module is further configured to make available to the synchronization module the chronological date associated with each of the detected synchronization pulses.

5. The equipment as claimed in claim 4, wherein the synchronization module is further configured to translate the chronological dates into calendar dates.

6. The equipment as claimed in claim 1 operating as slave equipment of the remote equipment, wherein the synchronization module is further configured to determine a time-based resetting setpoint.

7. The equipment as claimed in claim 6, wherein the synchronization module is configured to determine the time-based resetting setpoint by measuring the outward time of flight added to the return time of flight of synchronization pulses exchanged with the remote equipment.

8. The equipment as claimed in claim 6, wherein the synchronization module is further configured to estimate a drift from a calendar time base by drifting successive time-based resetting setpoints.

9. The equipment as claimed in claim 6, further comprising a generator of a clock signal, wherein the timer is incremented by the clock signal, by a multiple or submultiple of the clock signal or by a signal synchronized with the clock signal and wherein the synchronization module is further configured to determine a resetting setpoint of the clock signal.

10. The equipment as claimed in claim 6, wherein the processing unit further comprises a module configured for acquisition and formatting of data from a sensor.

11. The equipment as claimed in claim 1 operating as master equipment of the remote equipment, wherein the synchronization module is further configured to determine calendar dates based on local chronological dates corresponding to transmission and reception dates of synchronization pulses detected and dated by the identification module and to generate and transmit to a transceiver useful data comprising the values of said calendar dates to be transmitted in signaling messages.

12. A system for remote transmission of data comprising a master equipment as claimed in claim 11 and a plurality of slave equipments.

13. A method implemented in an equipment as claimed in claim 1, comprising the steps of identifying and dating in a local time base, by means of the identification module of the digital block, of synchronization pulses exchanged with the remote equipment.

14. The method as claimed in claim 13, further comprising a step of determining, by the synchronization module of the processing unit, of a setpoint of resetting of the local time base with respect to a reference time base of a master equipment by making joint use of the dating of the synchronization pulses, carried out by the identification module of the digital block, and of the useful data extracted from signaling messages by a transceiver.

15. A non-transitory computer-readable medium comprising instructions which, when executed by a processor, lead the latter to implement the method as claimed in claim 13.

16. A non-transitory computer-readable medium comprising instructions which, when executed by a processor, lead the latter to implement the determination step of the method as claimed in claim 14.

* * * * *